United States Patent [19]

Newcomb

[11] 4,145,056
[45] Mar. 20, 1979

[54] RECORD CATCHER

[75] Inventor: Robert D. Newcomb, Glendale, Calif.

[73] Assignee: Newcomb Audio Products Co., Sylmar, Calif.

[21] Appl. No.: 877,114

[22] Filed: Feb. 13, 1978

Related U.S. Application Data

[63] Continuation of Ser. No. 598,694, Jul. 24, 1975, abandoned.

[51] Int. Cl.² .................................................. G11B 3/62
[52] U.S. Cl. ................................. 274/10 S; 274/39 R
[58] Field of Search .................. 274/1 R, 10 S, 10 SS, 274/39 R, 39 A, 42 R

[56]       References Cited
U.S. PATENT DOCUMENTS 1,950,693   3/1934   Owens ............................. 274/39 R
2,302,503  11/1942   Proctor ........................... 274/39 R
2,651,523   9/1953   Dale ................................ 274/10 S
3,245,689   4/1966   Tatter et al. .................... 274/10 S

FOREIGN PATENT DOCUMENTS 21379   7/1929   Australia ............................. 274/39 R Primary Examiner—Richard E. Aegerter
Assistant Examiner—John W. Shepperd
Attorney, Agent, or Firm—Flam & Flam

[57]            ABSTRACT

The adapter has a large diameter circular base to fit the corresponding large diameter hole of the record disc. The adapter is generally conical with its tip generally cylindrically extended at which region a plurality of notches or grooves preferably are formed. The edge of the record disc hole is engaged to catch the disc if it tends to bounce or slide away. The tip also provides a handle for an attachment otherwise difficult to grasp.

3 Claims, 2 Drawing Figures

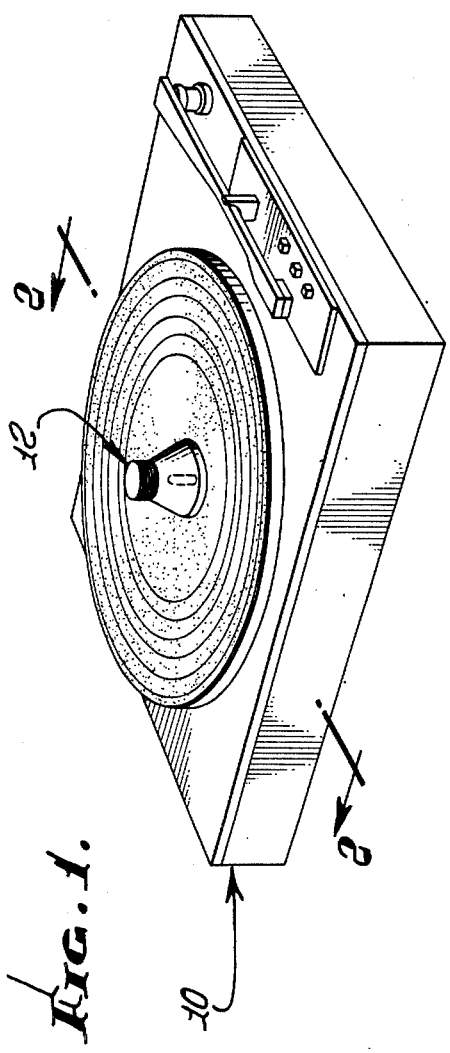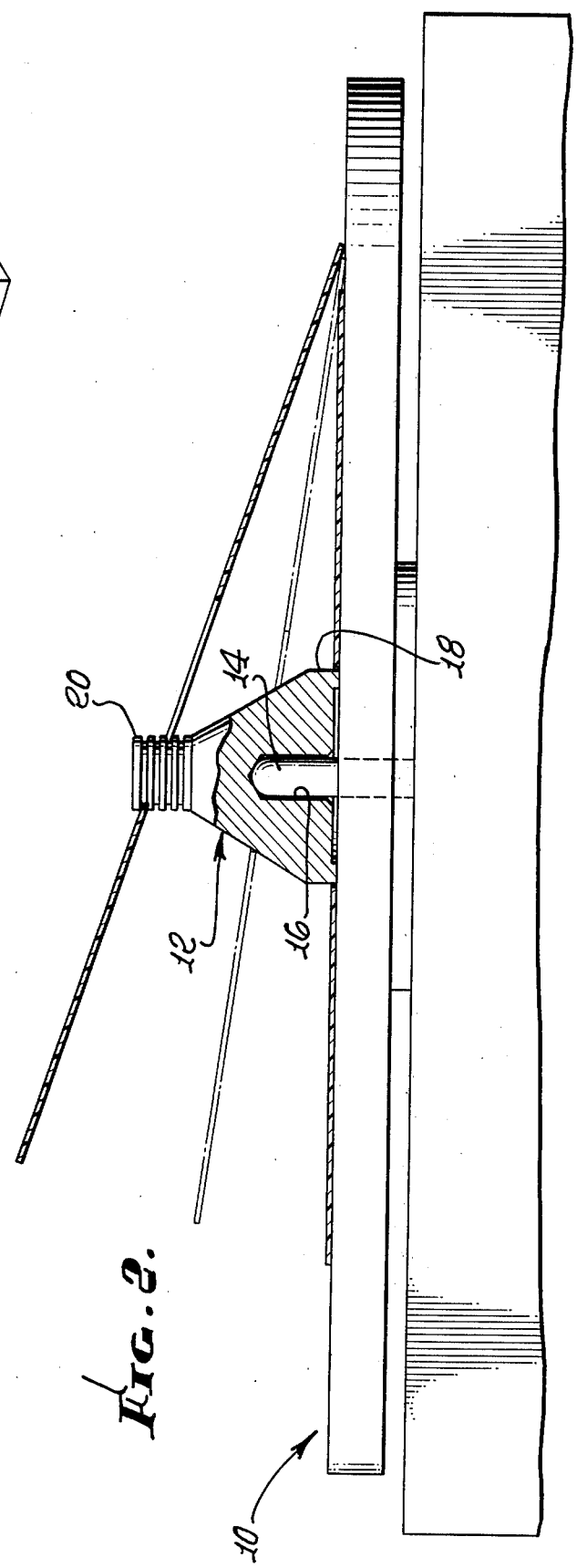

RECORD CATCHER

This is a continuation application of Ser. No. 598,694, filed July 24, 1975, abandoned Feb. 13, 1978.

FIELD OF THE INVENTION

The present invention relates to phonograph turntables, and more particularly to adapters for record discs having large diameter holes.

DISCUSSION OF THE PRIOR ART

The conventional adapter for a 45 rpm or other record disc having a large diameter hole comprises a wafer like disc spring pressed upwardly. Placement of the record on the thin disc requires some agility and attention in order to achieve proper registry. An improved arrangement utilizes a generally conical structure that achieves registry automatically even if a slight misalignment exists at the outset. I have found, however, that there is a tendency for the record to bounce or slide off the cone. Moreover, it is difficult to grasp the conical adapter. Often it is awkwardly engaged at its edge for such purposes.

The object of the present invention is to provide a simple adapter of the present character that achieves automatic registry without the danger of the record bouncing or sliding off and which, at the same time, provides a good grip or handle for placement and removal.

SUMMARY OF INVENTION

In order to accomplish the foregoing object, I provide a conical adapter that has an upwardly extended, generally cylindrical tip, apex or nose portion. Preferably a plurality of notches or grooves are provided that may assist both functions. If the record tends to bounce or slide, the notches or grooves may engage the record edge to stop it whereupon the record returns by gravity to seat over the conical adapter. The notches or grooves provide an improved grip particularly if the surface is smooth. The invention is useful both in manual and automatic modes of operation of the phonograph.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 1 is a pictorial view of a turntable having an adapter incorporating the present invention.

FIG. 2 is an enlarged axial sectional view taken along a plane corresponding to line 2—2 of FIG. 1, and illustrating a record disc restrained by the adapter.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

In FIG. 1 there is illustrated a turntable 10 of conventional design having a small diameter spindle upon which the adapter 12 is mounted. The adapter 12 is generally conical, as shown in FIG. 2, with its base adapted to rest upon the central portion of the turntable surface.

The adapter may be held in registry with the spindle 14 by suitable means. In the present instance, the adapter is made of metal so that it has sufficient weight to maintain registry between the spindle 14 and a mating hole 16 in the bottom of the adapter.

The adapter has, at its base, a cylindrical portion 18 designed to fit the central hole of a 45 rpm or other record. The portion 18 has sufficient height to accommodate a plurality of records, such as may be received from a record changer (not shown).

The central portion of the adapter is conical whereby a record dropped on the adapter with general registry therewith will, by virtue of its weight, center itself and come to rest on the cylindrical bottom portion 18.

In order to prevent the record from bouncing or sliding off, the top of the adapter has a generally cylindrical tip or extension 20 preferably provided with a series of notches or grooves. Should the record tend to bounce or slide, the tip serves as a stop. The tip 20 serves as a stop because it extends a significant distance vertically upwardly from the apex of the conical central portion of the adapter. Yet the tip is small enough in diameter to preclude interference while the record centers itself as it drops down over the central conical portion. The grooves may in some cases assist the stopping function by interengagement with the record hole edge. I have found that the cylindrical portion 20 is operative and effective notwithstanding a rather small relative height.

The tip 20 serves as a convenient handle for placement and removal of the adapter.

Intending to claim all novel, useful and unobvious features shown or described, I make the following claims:

1. A unitary record adapter for a record disc that has a relatively large diameter 45 rpm hole;
   a. said adapter having a generally cylindrical base portion adapted to register with the hole of said record disc;
   b. said base portion having a lower surface at which a downwardly facing recess opens adapted to register with and fit a relatively small diameter or 33 rpm turntable spindle;
   c. said adapter having a substantially conical central portion extending upwardly from said base portion to guide said record into registry with said cylindrical base portion, said conical central portion defining the location of an imaginary apex at the center of said conical central portion;
   d. said conical portion having a substantial angularity where it joins said cylindrical base to ensure that gravity completes the movement of said record onto said base;
   e. said conical central portion having an integral extension or tip peripherally joined thereto and extending a significant distance above and beyond said imaginary apex for catching the record when the record bounces or slides to stop the record from moving laterally entirely out of registry with said adapter and to cause the record to return to registry with said cylindrical base portion, the peripheral profile of said adapter being continuous and free of any upwardly facing shoulder that would restrain downward movement of said record disc; and f. said extension or tip having a diameter relatively small compared to said large diameter hole in order to avoid interference while the record centers itself as it drops over said central conical portion.

2. A record adapter for a record disc that has a relatively large diameter 45 rpm hole;
   a. said adapter having a generally cylindrical base portion adapted to register with the hole of said record disc;
   b. said base portion having a lower surface at which opens a downwardly facing recess adapter to register with a relatively small diameter or 33 rpm turntable spindle;
   c. said adapter having a substantially conical central portion extending upwardly from said base portion to guide said record into registry with said cylindrical base portion, said conical central portion defining the location of an imaginary apex at the center of said conical central portion;
   d. said conical portion having a substantial angularity where it joins said cylindrical base to ensure that gravity completes the movement of said record onto said base;
   e. said conical central portion having an integral extension or tip extending a significant distance above and beyond said imaginary apex for catching the record when the record bounces or slides to stop the record from moving laterally entirely out of registry with said adapter and to cause the record to return to registry with said cylindrical base portion;
   f. said extension or tip having a diameter relatively small compared to said large diameter hole in order to avoid interference while the record centers itself as it drops over said central conical portion; and
   g. said extension or tip having a series of horizontally extending circumferential grooves.

3. The combination as set forth in claim 2 in which said circumferential grooves comprise a series of spaced annuli.

* * * * *